United States Patent Office 3,318,485
Patented May 9, 1967

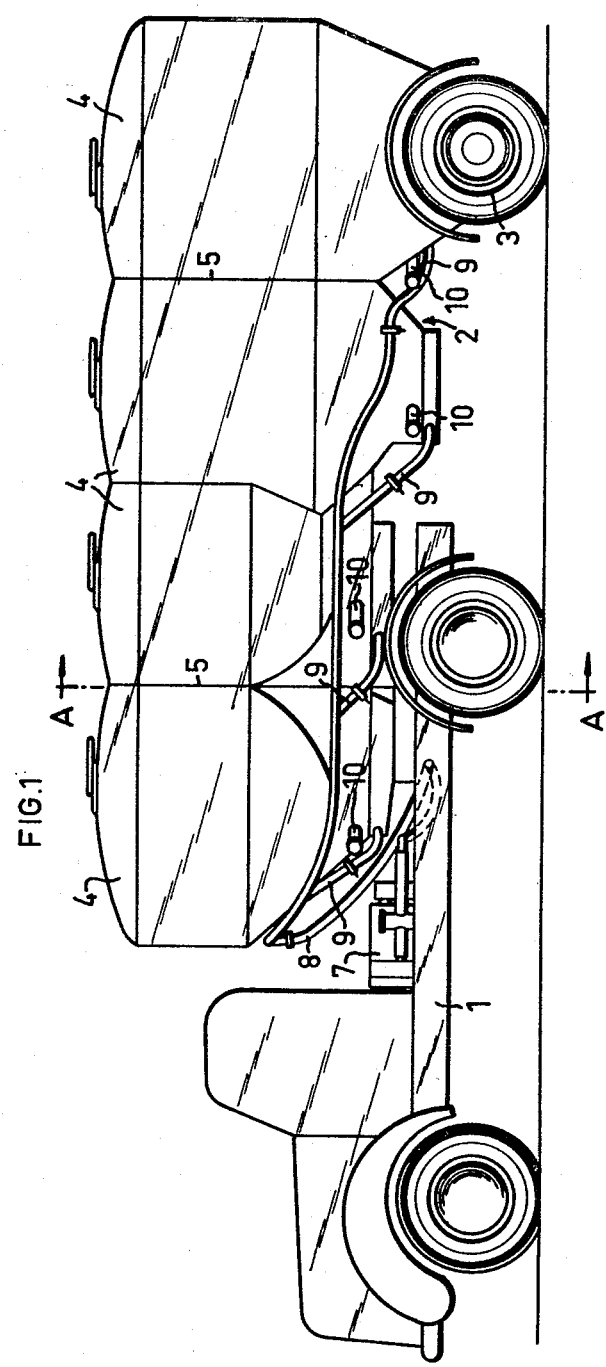

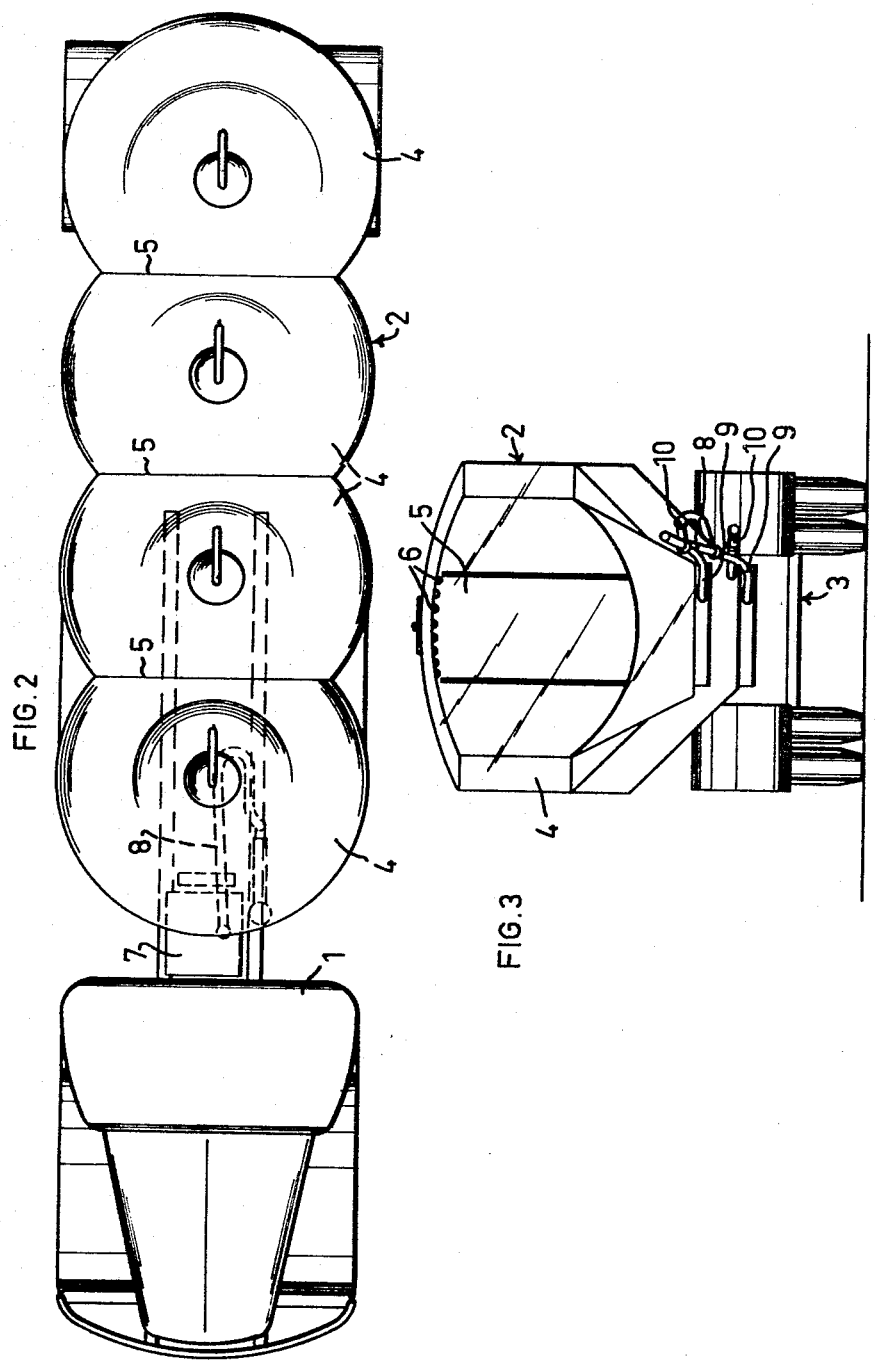

3,318,485
TANK VEHICLES FOR THE TRANSPORTATION OF POWDERY MATERIALS
Lars Erik Landeborg, Malmo, Sweden, assignor to Franz Whernman AB Konsulterande Ingeniorsbyra, Malmo, Sweden, a Swedish firm
Filed June 16, 1965, Ser. No. 464,389
6 Claims. (Cl. 222—136)

The present invention refers to an arrangement in tank vehicles for the transportation of powdery materials.

It is generally known for the transportation of powdery material, e.g. cement, to use tank vehicles in which several upright, usually cylindrical, transport containers are mounted in a row after one another in the longitudinal direction of the vehicles, each transport container being provided with pneumatic means for discharging the contents thereof. For the purpose of obtaining a great transport volume of each vehicle unit it is desirable that it should comprise at least three or preferably still more, such as four or five, containers in a row. In the tank vehicles as known at present, more particularly of the kind intended for road service (tank trucks), an increase of the number of containers beyond three would cause an excessively great over-all length and a great increase of the vehicle weight in relation to the increase of transport volume.

The object of the invention is to provide an arrangement by which the number of transport containers of a tank vehicle which is equipped with means for pneumatic discharge of the contents of said containers may be increased so as to obtain a considerable increase of the transport volume (load capacity) without excessively increasing the over-all length of the vehicle.

The arrangement according to the invention is thus intended to be employed in tank vehicles of the kind in which several upright transport containers are mounted in a row after one another in the longitudinal direction of the vehicle and are each provided with pneumatic means for emptying the containers by placing them under an overpressure and pressing out the powdery material from the bottom end. This arrangement is characterized by the fact that the upright containers are formed as sections of a single large container, said sections having arc-shaped side walls and being separated from each other by flat vertical partitions but being in pressure equalizing communication with each other near the top of the container.

In the following the arrangement according to the invention will be described in connection with a tank truck and with reference to the accompanying drawings, in which:

FIG. 1 is a lateral view of the tank truck,
FIG. 2 is a plan view thereof, and
FIG. 3 is a vertical cross-section along the line A—A in FIG. 1.

In the drawings, the tank truck illustrated is of the type which consists of a traction vehicle 1 and a trailer 2, the latter substantially consisting of a large container resting on the turn-table of the traction vehicle 1 and on the wheel undercarriage 3. This container is composed of four aligned upright partial containers or sections 4 which have arc-shaped side walls and are separated from each other by flat vertical partitions 5. The partial containers 4 may otherwise be of different shape and volume. Preferably, they are in the shape of cylinders tapering at the bottom to form funnels, said cylinders being flattened on the side or sides where they border on the adjacent partial container or containers. All the partial containers 4 are in communication with each other near the top through a row of apertures 6 in each of the partitions 5.

For the purpose of emptying the partial containers 4 when filled with a powdery material, e.g. flour or cement, the tank truck is equipped with pneumatic means. This means includes a power operated compressor assembly 7 mounted on the traction vehicle, a tube conduit 8 issuing from the delivery side of said assembly and having branches 9 connected to the bottom part of each partial container 4, and a discharge tube 10 for the powdery material issuing from each partial container 4 at or near the bottom end thereof. The discharge tube 10, which is connected to an opening (not shown) in the bottom of the container for discharging the powdery material, also communicates with a compressed air conduit so as to be passed by an air current which will press (blow) out the powdery material. Preferably, said compressed air conduit may be a tube extending from the top space of the container 4 and disposed within the latter, so that it is not visible in the drawings. The air which is blown into each partial container 4 through the tube conduits 8 and 9 and rises through the powdery material causing loosening thereof, may thus pass out through the discharge tube 10 pressing out the powdery material. The same compressed air is thereby used first for obtaining the loosening action and then for discharging the material. Whether the air supplied through the tube conduit 8 which causes the overpressure within the partial container 4 subsequently also creates the air current which provides for the discharge of the material or the discharge is effected by means of air which arrives direct from the compressor assemby 7 through a particular tube conduit, the overpressure which arises in one of the containers in the case of emptying this container alone would, if the partial containers were completely shut off from each other, exert a unilaterally acting force on the partition or partitions 5 and cause a more or less heavy bulging thereof. This is avoided by the provision of the apertures 6, through which the pressures on both sides of the partitions are equalized, so that the partitions may be made from sheet metal which is thinner than that of the cylindrical side walls. This involves the additional advantage of a reduction of the dead weight of the tank truck as compared with a tank truck of the same load capacity having independent tanks.

What I claim is:

1. A tank vehicle for transporting powdery materials, comprising a chassis, a closed container resting on said chassis, flat vertical partitions in said container subdividing it into several upright partial containers, said flat vertical partitions being made from thinner sheet metal than said outer side walls, each of said partial containers having arc-shaped outer side walls, pneumatic means for creating an overpressure in said partial containers and for pressing out powdery material from the bottom end thereof, and means for providing permanent pressure equalizing communiation between said partial containers adjacent the top thereof.

2. A tank vehicle for transporting powdery materials, comprising a chassis, a plurality of upright closed containers mounted in a row on said chassis and having top, bottom and side walls, each container having arcuate outer side walls which have vertical axes of curvature, a flat vertical partition common to two adjacent containers and connected substantially throughout its periphery to both of said adjacent containers, pneumatic means for creating an overpressure in said containers and for pressing out powdery material from the bottom end thereof, said vertical partitions having a plurality of spaced apart apertures only adjacent the top thereof.

3. A tank vehicle according to claim 2 in which the top walls of said containers are arcuate with a radius of curvature greater than that of said side walls and thus are capable of withstanding less internal pressure than said side walls; whereby the connection between said flat vertical partition and said side walls serves to resist outward flexing of the top walls.

4. A tank according to claim 2 in which said apertures in the vertical partition are located in the upper edge of the flat vertical partition and are separated from each other by portions of said partition which are connected to said top walls.

5. A tank vehicle according to claim 4 in which said flat vertical partitions are made from thinner metal than said outer side walls.

6. A tank vehicle according to claim 5 having means in the lower portion of the containers for introducing compressed air to the containers, and a discharge opening in the lower portion of the containers for discharge of the powdery materials in the containers.

References Cited by the Examiner

UNITED STATES PATENTS

| 731,918 | 6/1903 | Landers | 222—135 |
| 1,765,844 | 6/1930 | Maynard et al. | 222—135 |
| 2,063,727 | 12/1936 | Davis | 222—135 X |
| 2,089,347 | 8/1937 | Dondlinger | 222—135 X |
| 2,919,158 | 12/1959 | Aller | 302—52 X |
| 3,081,104 | 3/1963 | Schmiermann | 280—5 |

FOREIGN PATENTS

| 64,020 | 9/1945 | Denmark. |
| 1,207,929 | 9/1959 | France. |

RAPHAEL M. LUPO, *Primary Examiner.*